United States Patent
Schuette et al.

(10) Patent No.: US 10,988,593 B2
(45) Date of Patent: Apr. 27, 2021

(54) COMPOSITION THAT IS SUITABLE FOR PRODUCING POLYURETHANE FOAMS AND THAT CONTAINS AT LEAST ONE NUCLEATING AGENT

(71) Applicants: BASF SE, Ludwigshafen (DE); Evonik Operations GmbH, Essen (DE)

(72) Inventors: Markus Schuette, Melle (DE); Mark Elbing, Bremen (DE); Johann Klassen, Stemwede-Oppendorf (DE); Frank Fechner, Melle (DE); Werner Wiegmann, Rahden (DE); Michael Klostermann, Essen (DE); Joachim Venzmer, Essen (DE); Christian Eilbracht, Herne (DE); Martin Glos, Borken (DE); Carsten Schiller, Ratingen (DE)

(73) Assignees: BASF SE, Ludwigshafen (DE); Evonik Operations GmbH, Essen (DE)

( * ) Notice: Subject to any disclaimer, the term of this patent is extended or adjusted under 35 U.S.C. 154(b) by 0 days.

(21) Appl. No.: 15/105,509

(22) PCT Filed: Dec. 18, 2014

(86) PCT No.: PCT/EP2014/078471
§ 371 (c)(1),
(2) Date: Jun. 16, 2016

(87) PCT Pub. No.: WO2015/091801
PCT Pub. Date: Jun. 25, 2015

(65) Prior Publication Data
US 2016/0326330 A1   Nov. 10, 2016

(30) Foreign Application Priority Data

Dec. 19, 2013   (EP) .................................... 13198303

(51) Int. Cl.
| | |
|---|---|
| *C08J 9/14* | (2006.01) |
| *C08J 9/00* | (2006.01) |
| *C08G 18/18* | (2006.01) |
| *C08G 18/20* | (2006.01) |
| *C08G 18/40* | (2006.01) |
| *C08G 18/28* | (2006.01) |
| *C08G 18/16* | (2006.01) |
| *C08G 18/08* | (2006.01) |
| *C08G 18/48* | (2006.01) |
| *C08G 101/00* | (2006.01) |
| *C08G 18/50* | (2006.01) |
| *C08G 18/76* | (2006.01) |

(52) U.S. Cl.
CPC .............. *C08J 9/149* (2013.01); *C08G 18/14* (2013.01); *C08G 18/163* (2013.01); *C08G 18/1808* (2013.01); *C08G 18/1816* (2013.01); *C08G 18/2036* (2013.01); *C08G 18/2825* (2013.01); *C08G 18/4018* (2013.01); *C08G 18/4804* (2013.01); *C08G 18/5021* (2013.01); *C08G 18/7671* (2013.01); *C08J 9/0004* (2013.01); *C08J 9/0019* (2013.01); *C08J 9/0023* (2013.01); *C08J 9/14* (2013.01); *C08G 2101/00* (2013.01); *C08J 2201/022* (2013.01); *C08J 2203/14* (2013.01); *C08J 2205/046* (2013.01); *C08J 2205/10* (2013.01); *C08J 2375/08* (2013.01)

(58) Field of Classification Search
CPC ... C08J 9/148; C08J 9/144; C08J 9/146; C08J 9/147–148; C08J 9/141
See application file for complete search history.

(56) References Cited

U.S. PATENT DOCUMENTS

| | | | |
|---|---|---|---|
| 3,578,612 A | 5/1971 | Burba et al. | |
| 3,933,695 A | 1/1976 | Omietanski et al. | |
| 4,147,847 A | 4/1979 | Schweiger | |
| 4,855,379 A | 8/1989 | Budnik et al. | |
| 5,290,823 A * | 3/1994 | Volkert | C08J 9/149 |
| | | | 521/131 |

(Continued)

FOREIGN PATENT DOCUMENTS

| | | |
|---|---|---|
| DE | 1 802 500 | 5/1969 |
| DE | 1 802 503 | 5/1969 |

(Continued)

OTHER PUBLICATIONS

Tan, Y. H. Structure Effect of Alcohols and Polyglycols on Bubble Rise Velocity. Thesis. Department of Mining and Materials Engineering, McGill University. Aug. 2013. pp. 133-156. (Year: 2013).*

(Continued)

*Primary Examiner* — Stephen E Rieth
(74) *Attorney, Agent, or Firm* — Grüneberg and Myers PLLC

(57) ABSTRACT

Disclosed herein is a method for producing polyurethane or polyisocyanurate foams. The method involves reacting a composition (Z1) with at least one polyisocyanate, and occurs in the presence of at least one nucleating agent and a blowing agent, in which the nucleating agent and the blowing agent are mixed to obtain a composition (Z2) that is added to the composition (Z1) before it is reacted with the at least one polyisocyanate. The composition (Z1) contains (i) 100 parts by mass of a composition (ZP) including at least one polyol and at least one catalyst that catalyzes formation of a urethane, urea or isocyanurate bond, and (ii) from 0.05 to 10 parts by mass of a surfactant TD having an HLB value below 6 and no silicon atom.

13 Claims, No Drawings

(56) References Cited

U.S. PATENT DOCUMENTS

| | | | |
|---|---|---|---|
| 5,318,996 A * | 6/1994 | Yu-Hallada | C08J 9/127 521/126 |
| 5,346,928 A | 9/1994 | De Vos et al. | |
| 5,889,067 A * | 3/1999 | Jang | C08G 18/282 521/117 |
| 6,034,145 A | 3/2000 | Cornet et al. | |
| 6,359,022 B1 | 3/2002 | Hickey et al. | |
| 6,420,443 B1 | 7/2002 | Clark et al. | |
| 6,472,446 B1 | 10/2002 | Riley et al. | |
| 2002/0010224 A1 * | 1/2002 | Wilson | C08G 18/284 521/114 |
| 2002/0103091 A1 | 8/2002 | Kodali | |
| 2005/0070619 A1 * | 3/2005 | Miller | C08G 18/2835 521/114 |
| 2007/0072951 A1 | 3/2007 | Bender et al. | |
| 2007/0238800 A1 | 10/2007 | Neal et al. | |
| 2007/0282026 A1 | 12/2007 | Grigsby, Jr. et al. | |
| 2008/0234402 A1 | 9/2008 | Lehmann et al. | |
| 2010/0305255 A1 * | 12/2010 | Grass | C07C 69/82 524/296 |
| 2013/0217797 A1 * | 8/2013 | Fricke | C08G 18/482 521/170 |

FOREIGN PATENT DOCUMENTS

| | | |
|---|---|---|
| DE | 1 745 443 | 5/1971 |
| DE | 1 745 459 | 9/1971 |
| DE | 25 33 074 | 3/1976 |
| DE | 39 30 824 A1 | 2/1991 |
| DE | 41 21 161 A1 | 1/1993 |
| DE | 42 29 402 A1 | 3/1994 |
| DE | 692 12 342 T2 | 12/1996 |
| DE | 692 13 166 T2 | 2/1997 |
| DE | 694 13 231 T2 | 3/1999 |
| DE | 696 00 838 T2 | 4/1999 |
| DE | 10 2004 001 408 A1 | 7/2005 |
| EP | 0 493 836 A1 | 7/1992 |
| EP | 0 533 202 A1 | 3/1993 |
| EP | 0 662 494 A1 | 7/1995 |
| EP | 0 767 199 A1 | 4/1997 |
| EP | 0 780 414 A2 | 6/1997 |
| EP | 0 839 852 A1 | 5/1998 |
| EP | 0 656 382 B1 | 8/1998 |
| EP | 0 867 464 A1 | 9/1998 |
| EP | 1 138 709 A1 | 10/2001 |
| EP | 1 209 189 A1 | 5/2002 |
| EP | 1 161 474 A1 | 4/2004 |
| EP | 2005/008383 A2 | 1/2005 |
| EP | 1 520 873 A2 | 4/2005 |
| EP | 1 544 235 A1 | 6/2005 |
| EP | 1 678 232 | 7/2006 |
| EP | 1 683 831 A1 | 7/2006 |
| EP | 1 712 578 A1 | 10/2006 |
| EP | 1 537 159 B1 | 9/2007 |
| EP | 1 873 209 A2 | 1/2008 |
| EP | 1 977 825 B1 | 10/2008 |
| EP | 1 985 642 A1 | 10/2008 |
| EP | 1 985 644 A1 | 10/2008 |
| WO | 96/12759 A2 | 5/1996 |
| WO | WO-9612759 A2 * | 5/1996 ......... C08G 18/6696 |
| WO | 98/42764 A1 | 10/1998 |
| WO | 2004/096882 A1 | 11/2004 |
| WO | 2005/019328 A1 | 3/2005 |
| WO | 2005/033167 A2 | 4/2005 |
| WO | 2005/085310 A2 | 9/2005 |
| WO | 2005/118668 A1 | 12/2005 |
| WO | 2006/037540 A2 | 4/2006 |
| WO | 2006/094227 A2 | 9/2006 |
| WO | 2006/116456 A1 | 11/2006 |
| WO | 2007/094780 A1 | 8/2007 |
| WO | 2007/111828 A2 | 10/2007 |
| WO | 2011/107374 A1 | 9/2011 |
| WO | 2011/134856 A1 | 11/2011 |
| WO | 2011/134866 A2 | 11/2011 |
| WO | 2013/026813 A1 | 2/2013 |

OTHER PUBLICATIONS

JEFFCAT Amine Catalysts: For the Polyurethane Industry—Americas Region. Huntsman Corporation. 2007. (Year: 2007).*

International Search Report dated Mar. 10, 2015 in PCT/EP2014/078471, filed Dec. 18, 2014.

William C. Griffin "Classification of Surface-Active Agents by 'HLB'", Journal of the Society of Cosmetic Chemists, Oct. 11, 1949, pp. 311-326.

John C. McGowan "A New Approach for the Calculation of HLB Values of Surfactants", Tenside, Surfactants, Detergents, vol. 27, No. 4, 1990, pp. 229-230.

R. Sowada et al. "Calculation of HLB Values", Tenside, Surfactants, Detergents. vol. 29, No. 2, 1992, pp. 109-113.

"Polyurethanes", Ullmann's Encyclopedia of Industrial Chemistry, vol. A21, 1992, pp. 665-716.

William C. Griffin "Calculation of HLB Values of Non-Ionic Surfactants", Journal of the Society of Cosmetic Chemists, May 14, 1954, pp. 249-256.

* cited by examiner

COMPOSITION THAT IS SUITABLE FOR PRODUCING POLYURETHANE FOAMS AND THAT CONTAINS AT LEAST ONE NUCLEATING AGENT

This application is a National Stage of PCT/EP2014/078471, which was filed on Dec. 18, 2014. This application is based on and claims the benefit of priority to European Application No. 13198303.3, which was filed on Dec. 19, 2013.

The present invention relates to a method of producing polyurethane or polyisocyanurate foams which comprises the step of reacting a composition (Z1), comprising a composition (ZP) at least comprising a polyol and a catalyst that catalyzes the formation of a urethane, urea or isocyanurate bond, and a surfactant TD having an HLB value below 10 and no silicon atom, wherein the sum total of surfactants TD in the stabilized composition comprises from 0.05 to 10 parts by mass per 100 parts by mass of the composition (ZP), with at least one polyisocyanate, wherein the step of reacting takes place in the presence of a nucleating agent selected from the group consisting of perfluorinated hydrocarbons, ethers having at least one perfluorinated hydrocarbyl moiety and ketones having at least one perfluorinated hydrocarbyl moiety, and of a blowing agent, wherein the nucleating agent differs from the blowing agent, and wherein the nucleating agent and the blowing agent are mixed to obtain a composition (Z2) and said composition (Z2) is added to said composition (Z1) before the step of reacting with the at least one polyisocyanate. The present invention further relates to a stabilized composition (ZS) and also to a kit for preparing a stabilized composition (ZS) for producing a polyurethane or polyisocyanurate foam, and to methods of producing polyurethane or polyisocyanurate foams by reacting a stabilized composition of the present invention and/or a stabilized composition obtained or obtainable according to a method of the invention.

The production of polyurethane and/or polyisocyanurate foams by expanding foamable reaction mixtures based on polyisocyanates, compounds having reactive hydrogen atoms, blowing agents, stabilizers and optionally further added substances is nowadays conducted on a large industrial scale. Insulation, in particular thermal insulation, is an important application for these foams. Insulation foams require the production of rigid foams having a relatively low density of <50 kg/m$^3$ and—an essential criterion—very many small closed cells (high cellular density).

A gas is needed to blow the foam. This can be $CO_2$, which is formed in the reaction of isocyanate with water or is additionally added, and/or an added low-boiling organic liquid.

Polyol compositions comprising blowing agent mixtures and also their use in the manufacture of polyurethane foams are known, for example from US 2002/0010224 A1.

The gas formed has to emerge from the liquid phase and form small gas bubbles which in the free rise phase of the foam grow to form the later foam cells. The creation of the initially microscopically small gas bubbles in the liquid phase is known as nucleation and like other physicochemical processes of nucleation (in precipitation reactions, for example) requires an activation energy. Bubble formation in nucleation may be augmented by using silicone foam stabilizers to lower the surface tension—and hence reduce the energy needed to form the bubble nuclei—and also to stabilize the dispersal of air in the reactive mixture. However, the positive influence of cell stabilizers on the nucleation and hence the cell fineness of the foam is subject to a saturation behavior with regard to the employed concentration of stabilizer, i.e., there is a limit to cell fineness wherebeyond cell fineness enhancement by further raising the stabilizer concentration is not possible.

Cell fineness enhancement—and thereby an improvement in the insulation properties of the foam—is possible by adding so-called nucleating agents. Nucleating agents may be solids or liquids that promote cell nucleation by an as yet incompletely elucidated mechanism.

Heterogeneous nucleation on solids, in particular the use of nanoparticles or of nanostructured particles, has been proposed (EP 1 683 831, EP 1 209 189, WO 2005/019328) as an engineering solution. They are generally premixed in the polyol components. The use of particles as nucleating agents in polyurethane foams (PU foams) in the manufacture of insulation materials, however, has failed to become established in commercial practice owing to various problems such as the sedimentation proclivity of the solid particles or their abrasiveness.

Liquid nucleating agents based on (per)fluorinated hydrocarbons are more effective and less problematic. Emulsions are formed, in particular microemulsions. Depending on the size of the dispersed particles, emulsions are milkily cloudy (macroemulsion) or clear (microemulsion).

DE 69212342 T2 for instance discloses the use of fluorinated alkanes to form microemulsions for polyol blends in the manufacture of specific very fine-cell and open-cell rigid foams employed as core materials in the manufacture of vacuum insulation panels. Cell fineness is provided by the fluorinated additives, while cell openness is achieved via cyclic carbonates such as glycerol carbonate, Fixapret CNF. The fluorinated additives used include, for example, perfluoropentane and perfluoro-2-butyltetrahydrofuran. Similar systems are described in U.S. Pat. No. 5,346,928, DE 69413231 T2, EP 0662494 A1 and DE 69600838 T2.

DE 69213166 T2 discloses the use of fluorinated inert organic liquids such as perfluorobutyl-tetrahydrofuran in combination with fluorosurfactants such as FC 430 from 3M in the manufacture of emulsions and/or microemulsions by employing an isocyanate prepolymer. This prepolymer is obtained by reaction of PMDI with low molecular weight glycols.

DE 4121161 A1 discloses the production of rigid polyurethane foams by use of vinylperfluoro-alkanes such as, for example, mixtures of vinylperfluoro-n-butane and 1H-perfluorohexane wherein the fluorinated compounds are in the form of an emulsion in either of the two components, for example the polyol blend. Foams having finer cells and a lower thermal conductivity are obtained as a result. Milky emulsions are obtained, but no microemulsions.

DE 3930824 A1 relates to the use of perfluoroalkanes such as perfluoropentane (boiling point 28° C.) as (main) blowing agent, which is emulsified in the polyol component. Stabilization is provided by inorganic emulsifiers such as silica gel particles having diameter of, for example, 5 µm or organic emulsifiers such as starch (amylum solubile). Blowing agent droplets having a diameter below 20 µm are stated to be obtainable.

U.S. Pat. No. 6,420,443 B1 discloses the use of specific ethoxylated triglycerides (OH number <90 and EO content >40%) such as, for example, ethoxylated castor oil in the manufacture of conventional emulsions to enhance the solubility of hydrocarbons in polyol blends. The prior art cited therein makes mention of further conventional compatibilizers such as, for example, fatty acids, alkylaromatics, monools and also alkoxylated versions thereof. Esters of fatty acids, fatty oils or phosphoric acid are also referred to.

Despite the proven effectiveness of (per)fluorinated hydrocarbons as nucleating agents, these substances have likewise failed to find wide use in the manufacture of PU foams, perhaps because the mixtures used lack shelf stability, since it is particularly when preformulated polyurethane systems are used in the manufacture of polyurethanes, for example in the manufacture of insulation materials for freezers, refrigerators and fridge-freezers, that importance is attached to the separation stability of the polyurethane systems and/or of the employed polyol mixtures.

Various surfactants have been proposed to effect solubilization between polyol systems and blowing agents.

WO 2007/094780 describes polyol mixtures comprising hydrocarbon blowing agents wherein an ethoxylate-propoxylate surfactant is admixed to the mixtures in order to improve the solubility of the blowing agent in the mixture.

U.S. Pat. No. 6,472,446 describes polyol mixtures comprising hydrocarbon blowing agents wherein a butanol-initiated propylene oxide polyether surfactant is admixed to the mixtures in order to improve the solubility of the blowing agent in the mixture.

WO 98/42764 likewise describes polyol mixtures comprising hydrocarbon blowing agents wherein a $C_{12}$-$C_{15}$ initiated polyether surfactant is admixed to the mixtures in order to improve the solubility of the blowing agent in the mixture.

WO 96/12759 likewise describes polyol mixtures comprising hydrocarbon blowing agents wherein a surfactant having an alkyl moiety of 5 or more carbon atoms is admixed to the mixtures in order to improve the solubility of the blowing agent in the mixture.

EP 0767199 A1 describes the use of diethanolamides of fatty acids of natural origin as a surfactant in the manufacture of polyol mixtures comprising hydrocarbon blowing agents.

EP 1520873 A2 describes mixtures of hydrohalocarbon blowing agents and blowing agent enhancers, which have a molecular weight of below 500 g/mol, wherein the blowing agent enhancers may be polyethers or monoalcohols, e.g., ethanol, propanol, butanol, hexanol, nonanol or decanol. The ratio of blowing agent to blowing agent enhancer is recited as 60-95 wt % to 40-5 wt %.

WO 2013/026813 describes microemulsions of polyols and apolar organic compounds that are obtained by employing at least one halogen-free compound, which comprises at least one amphiphilic compound which comprises selected from nonionic surfactants, polymers and mixtures thereof and at least one compound other than said compound, and the use thereof in the manufacture of polyurethanes. The apolar compounds employed may also comprise fluorinated compounds.

Since the solution properties of perfluorinated and/or highly fluorinated hydrocarbons differ fundamentally from those of unfluorinated and/or minimally fluorinated hydrocarbons, the additives proposed for hydrocarbon-based blowing agents are not applicable to the issue addressed herein.

Proceeding from the prior art, therefore, the present invention has for its object to provide a method of producing polyurethanes and/or polyisocyanurates without the mixtures which are reacted in said method undergoing any phase separation in the course of said method, and/or to provide a composition comprising polyols and a nucleating agent as well as blowing agents whose handling and processing is readily possible with existing equipment according to the customary processes, and which thus can be used for the production of polyurethane foams in existing equipment, and/or methods to stabilize the corresponding polyol components.

We have found that this object is achieved according to the present invention by a method of producing polyurethane or polyisocyanurate foams which comprises the step of reacting
(a) a composition (Z1), comprising
  (i) a composition (ZP) at least comprising a polyol and a catalyst that catalyzes the formation of a urethane, urea or isocyanurate bond, and
  (ii) a surfactant TD having an HLB value below 10 and no silicon atom, wherein the sum total of surfactants TD in the composition comprises from 0.05 to 10 parts by mass per 100 parts by mass of the composition (ZP),
(b) with at least one polyisocyanate,
wherein the step of reacting takes place in the presence of a nucleating agent selected from the group consisting of perfluorinated hydrocarbons, ethers having at least one perfluorinated hydrocarbyl moiety and ketones having at least one perfluorinated hydrocarbyl moiety, and of a blowing agent, wherein the nucleating agent differs from the blowing agent, and
wherein the nucleating agent and the blowing agent are mixed to obtain a composition (Z2) and said composition (Z2) is added to said composition (Z1) before the step of reacting with the at least one polyisocyanate.

The method of producing polyurethane or polyisocyanurate foams in the manner of the present invention comprises reacting a composition (Z1)), comprising a composition (ZP) at least comprising a polyol and a catalyst that catalyzes the formation of a urethane, urea or isocyanurate bond, and a surfactant TD having an HLB value below 10 and no silicon atom, wherein the sum total of surfactants TD in the composition comprises from 0.05 to 10 parts by mass per 100 parts by mass of the composition (ZP), with a polyisocyanate. The reaction takes place in the presence of a nucleating agent selected from the group consisting of perfluorinated hydrocarbons, ethers having at least one perfluorinated hydrocarbyl moiety and ketones having at least one perfluorinated hydrocarbyl moiety, and of a blowing agent, wherein the nucleating agent differs from the blowing agent.

The inventors found that, surprisingly, separation-stable and thus phase-stable compositions comprising polyol(s), blowing agents and nucleating agents and also, optionally, additives are obtained on additionally including in the mixture a surfactant having an HLB value below 10, preferably below 7, more preferably below 6. Therefore, in the practice of the method according to the present invention, the particular mixtures in each of the reaction steps do not give rise to any phase separation that could lead to process disruptions or upsets.

The invention utilizes at least one nucleating agent and at least one blowing agent subject to the proviso that the nucleating agent differs from the blowing agent, i.e., two different compounds are used. It is possible here that the nucleating agent used will act to some extent as a blowing agent as well as a nucleating agent. Similarly, the blowing agent used may act to a certain extent as a nucleating agent as well as a blowing agent.

According to the invention, the blowing agent and the nucleating agent are added to the composition (Z1) before the step of reacting with the polyisocyanate. It will be found to be particularly advantageous to mix the blowing agent and the nucleating agent and then to admix the resultant mixture to the composition (Z1).

The present invention accordingly provides a method of producing polyurethane or polyisocyanurate foams as described above wherein the blowing agent is added to the composition (Z1) before the step of reacting with the at least one polyisocyanate.

The present invention provides a method of producing polyurethane or polyisocyanurate foams as described above wherein the nucleating agent and the blowing agent are mixed to obtain a composition (Z2) and the composition (Z2) is added to the composition (Z1) before the step of reacting with the at least one polyisocyanate.

Surprisingly, it is precisely the addition order of the present invention and/or the mixture of the various components which provides phase-stable mixtures. If, for example, the polyol component is admixed first with the surfactant, then with the nucleating agent and finally with the blowing agent, phase separation occurs. If the polyol component is admixed first with the surfactant, then with the blowing agent and finally with the nucleating agent, phase separation can be avoided provided a high level of stirrer energy is applied, making this procedure uneconomical. An addition order in accordance with the present invention, i.e., premixing the nucleating agent and the blowing agent and admixing this mixture to the polyol component comprising the surfactant, provides phase-stable mixtures without having to apply a high level of stirrer energy.

The present invention further provides a kit for preparing a stabilized composition (ZS) for producing a polyurethane or polyisocyanurate foam, said kit consisting of (I) a composition (Z1) at least comprising
  a composition (ZP) comprising at least one polyol and at least one catalyst that catalyzes the formation of a urethane, urea or isocyanurate bond, and at least one surfactant TD having an HLB value below 10 and no silicon atom, wherein the sum total of surfactants TD in the composition comprises from 0.05 to 10 parts by mass per 100 parts by mass of the composition (ZP), and (II) a composition (Z2) at least comprising
  a nucleating agent selected from the group consisting of perfluorinated hydrocarbons, ethers having at least one perfluorinated hydrocarbyl moiety and ketones having at least one perfluorinated hydrocarbyl moiety, and a blowing agent, wherein the nucleating agent differs from the blowing agent.

The kit of the present invention accordingly consists of a composition (Z1) and a composition (Z2). Said composition (Z1) and said composition (Z2) can be mixed to obtain a stabilized composition (ZS) which is useful for producing a polyurethane or polyisocyanurate foam.

The present invention accordingly also provides a stabilized composition (ZS) at least comprising (a) at least one composition (ZP) at least comprising at least one polyol and at least one catalyst that catalyzes the formation of a urethane, urea or isocyanurate bond, (b) at least one surfactant TD having an HLB value below 10 and no silicon atom, wherein the sum total of surfactants TD in the composition comprises from 0.05 to 10 parts by mass per 100 parts by mass of the composition (ZP), (c) at least one nucleating agent selected from the group consisting of perfluorinated hydrocarbons, ethers having at least one perfluorinated hydrocarbyl moiety and ketones having at least one perfluorinated hydrocarbyl moiety, (d) at least one blowing agent, wherein the blowing agent differs from the nucleating agent, wherein said composition (ZS) is a phase-stable liquid in that said composition (ZS) to the naked eye does not consist of two or more phases at an ambient temperature of 20° C.

The stabilized composition of the present invention accordingly comprises at least one composition (ZP), at least one surfactant TD, at least one nucleating agent and at least one blowing agent, of which said composition (ZP) comprises at least one polyol and at least one catalyst as defined above. Said composition (ZS) is a phase-stable liquid in that said composition (ZS) to the naked eye does not consist of two or more phases at an ambient temperature of 20° C. The period for which the composition is phase-stable is preferably not less than 48 hours, more preferably not less than 72 hours and yet more preferably not less than 120 hours.

Accordingly, the period for which the stabilized compositions (ZS) of the present invention do not display any macroscopically recognizable interface is preferably not less than 48 hours, more preferably not less than 72 hours and yet more preferably not less than 120 hours, and the period for which the composition is thermodynamically homogeneous is preferably not less than 48 hours, more preferably not less than 72 hours and yet more preferably not less than 120 hours.

The stabilized compositions (ZS) of the present invention are phase-stable and hence shelf-stable. Accordingly, they can be prepared and stored some time prior to further processing, for example prior to the reaction with isocyanates. However, it is likewise possible to prepare the compositions (ZS) in the process of the present invention shortly before any further reaction, for example with an isocyanate. It is thus also possible for the process of preparing a stabilized composition (ZS) in the manner of the present invention to take place via a mix head in a process wherein any further reaction of the stabilized composition takes place directly after the preparation of the latter.

The HLB value is typically used to select emulsifiers for the preparation of oil-water emulsions. It was accordingly unforeseeable that such a value is also useful for the selection of surfactants for polyol systems. The HLB value of a surfactant is computable by the increment method of Griffin (W. C. Griffin, *J. Cos. Cosmet. Chem.*, 1950, 311:5, 249) and McGowan (J. C. McGowan, *Tenside Surfactants Detergents*, 1990, 27, 229). In this method, the HLB value of a molecule can be assembled from individual increments of its molecular building blocks as per Equation 1.

$$HLB = 7 + \Sigma H_h + \Sigma H_l \quad \text{(Eq. 1)}$$

$H_h$ and $H_l$ here are the HLB group numbers of the individual hydrophilic and lipophilic, respectively, molecular building blocks. Typical values of $H_h$ and $H_l$ are listed in table 1.

TABLE 1

HLB group numbers of various molecular building blocks (see also table 3 in R. Sowada and J. C. McGowan, *Tenside Surfactants Detergents*, 1992, 29, 109)

| | Molecular building block | HLB group number |
|---|---|---|
| $H_h$ | —O— (ether) | 1.3 |
| | —OH (free) | 1.12 |
| | —COOH (free) | 2.09 |
| | —COO— (ester) | 2.28 |
| | —CONH—R (amide) | 2.136 |
| | —CON—R$_2$ (amide) | 2.319 |
| | —NH$_2$ (free) | 8.59 |

TABLE 1-continued

HLB group numbers of various molecular building blocks
(see also table 3 in R. Sowada and J. C. McGowan,
*Tenside Surfactants Detergents*, 1992, 29, 109)

| | Molecular building block | HLB group number |
|---|---|---|
| $H_l$ | —(CH$_2$CH$_2$O)— | 0.353 |
| | —CH$_3$ | −0.658 |
| | —CH$_2$—R | −0.457 |
| | —CH—R$_2$ | −0.295 |
| | —CH= | −0.402 |

The process of the present invention and the stabilized compositions (ZS) of the present invention have the advantage that larger amounts of nucleating agents, in particular nucleating agents which have perfluorinated hydrocarbyl moieties and which may optionally have oxygen atoms, can be incorporated without the compositions obtained displaying any phase separation to the naked eye even after a storage period of, for example, 72 hours.

The subjects of the present invention are illustratively described hereinbelow without any intention to limit the invention to these illustrative embodiments. Where ranges, general formulae or compound classes are specified hereinbelow, these shall include not just the corresponding ranges or groups of compounds that are explicitly mentioned but also all sub-ranges and sub-groups of compounds which can be obtained by extracting individual values (ranges) or compounds. When documents are cited in the context of the present description, the contents thereof, particularly with regard to the substantive matter that forms the context in which the document was cited, are considered in their entirety to form part of the disclosure of the present invention. Unless stated otherwise, percentages are by weight. Where average values are reported hereinbelow, the values in question are weight averages, unless stated otherwise. When parameters which have been determined by measurement are reported hereinbelow, they have been determined at a temperature of 20° C. and a pressure of 101 325 Pa, unless stated otherwise.

Polyurethane foam (PU foam) is to be understood in the context of the present invention as meaning foam obtained as a reaction product based on isocyanates and compounds having isocyanate-reactive groups, for example polyols. In the course of the reaction to form the eponymous polyurethane, further functional groups may also be formed, examples being allophanates, biurets, ureas or isocyanurates. Therefore, PU foams within the meaning of the present invention include polyisocyanurate foams (PIR foams) as well as polyurethane foams (PUR foams). Rigid polyurethane foams are the preferred type of polyurethane foam.

The method of the present invention utilizes at least one surfactant TD, wherein the sum total of surfactants TD in the composition comprises in the range from 0.05 to 10 parts by mass per 100 parts by mass of the composition (ZP).

The sum total of surfactants TD in the composition comprises preferably in the range from 0.1 to 8 and more preferably in the range from 0.5 to 7 parts by mass per 100 parts by mass of the composition (ZP).

The surfactant TD is preferably at least one compound of formula (I),

R—[C(O)]$_x$—Y (I)

where C(O) is a carbonyl group, x is =0 or 1, R is a linear, branched or cyclic, saturated or unsaturated, preferably saturated, hydrocarbyl moiety, having at least 4, preferably from 8 to 30, more preferably from 9 to 20 and yet more preferably from 9 to 18 carbon atoms, and Y is =O—R$^1$ or NR$^1$R$^2$ or O—CH$_2$—CH(OR$^3$)—CH$_2$OH, each with R$^1$ and R$^2$ being identical or different (C$_n$H$_{2n}$O)$_m$—H moieties, where n is =2 to 4, preferably n is =2 to 3, more preferably n is =2, and also m is =0-15, preferably m is =0-10, more preferably m is =0 or 1-6, and R$^1$ and R$^2$ may be mutually identical or different, and with R$^3$ being =H or R' or C(O)R', where R' is a hydrocarbyl moiety as defined for R and may be the same as or different from the R moiety.

In a further embodiment, the present invention accordingly provides a method of producing polyurethane or polyisocyanurate foams as described above wherein the surfactant TD is preferably at least one compound of formula (I),

R—[C(O)]$_x$—Y (I)

where C(O) is a carbonyl group, x is =0 or 1, R is a linear, branched or cyclic, saturated or unsaturated hydrocarbyl moiety, having at least 4, preferably from 8 to 30, more preferably from 9 to 20 and yet more preferably from 9 to 18 carbon atoms, and Y is =O—R$^1$ or NR$^1$R$^2$ or O—CH$_2$—CH(OR$^3$)—CH$_2$OH, each with R$^1$ and R$^2$ being identical or different (C$_n$H$_{2n}$O)$_m$—H moieties, where n is =2 to 4, preferably n is =2 to 3, more preferably n is =2, and also m is =0-15, preferably m is =0-10, more preferably m is =0 or 1-6, and with R$^3$ being =H or R' or C(O)R', where R' is a hydrocarbyl moiety as defined for R and may be the same as or different from the R moiety.

Particularly preferred surfactants TD are those which have at least one hydrocarbyl moiety having at least 4 carbon atoms, preferably having at least 8 carbon atoms and more preferably having 9 to 18 carbon atoms, and which have an HLB value below 10, preferably below 7, more preferably below 6.

In a further embodiment, the present invention accordingly provides a method of producing polyurethane or polyisocyanurate foams as described above wherein the surfactant TD has at least one hydrocarbyl moiety having at least 4 carbon atoms and an HLB value below 10.

In a further embodiment, the present invention provides a method of producing polyurethane or polyisocyanurate foams as described above wherein the surfactant TD has an HLB value of below 6.

A surfactant TD of formula (I) where x is =0 and Y is =O—R$^1$ is preferably selected from the group consisting of alcohol alkoxylates based on octanol, nonanol, isononanol, capryl alcohol, decanol, lauryl alcohol, tridecanol, isotridecanol, myristyl alcohol, cetyl alcohol, stearyl alcohol or isostearyl alcohol, more preferably ethoxylates thereof. The corresponding fatty alcohol alkoxylates are obtainable as described in the prior art.

A surfactant TD of formula (I) where x is =0 and Y is =O—R$^1$ and m is =0 is preferably selected from the group consisting of octanol, nonanol, in particular isononanol, capryl alcohol, lauryl alcohol, tridecanol, isotridecanol, myristyl alcohol, cetyl alcohol, stearyl alcohol, isostearyl alcohol, tridecanol, decanol, dodecanol or a mixture thereof, preferably isotridecanol and/or, preferably or, isononanol (3,5,5-trimethyl-1-nonanol).

A surfactant TD of formula (I) where x is =0, Y is =NR$^1$R$^2$ and m is =0 is preferably selected from the group consisting of fatty amines, preferably octylamine, nonylamine, isononylamine, caprylamine, laurylamine, tridecylamine, isotridecylamine, myristylamine, cetylamine, stearylamine or isostearylamine. Where m and n are both not 0, the surfactants TD are more preferably ethoxylates of these amines.

A surfactant TD of formula (I) where x is =0 and Y is =O—CH$_2$—CH(OR$^3$)—CH$_2$OH is more preferably a glycerol mono- or diether of a saturated or unsaturated alcohol, e.g., octanol, nonanol, isononanol, capryl alcohol, lauryl alcohol, tridecanol, isotridecanol, myristyl alcohol, cetyl alcohol, stearyl alcohol or isostearyl alcohol.

In a further embodiment, the present invention accordingly provides a method of producing polyurethane or polyisocyanurate foams as described above wherein the surfactant TD is isotridecanol or isononanol.

A surfactant TD of formula (I) where x is =1 and Y is =O—R$^1$ is preferably selected from the group consisting of alkoxylates, more preferably ethoxylates, of saturated or unsaturated fatty acids having up to 30 carbon atoms such as, for example, butyric acid (butanoic acid), caproic acid (hexanoic acid), caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachidic acid (eicosanoic acid) behenic acid (docosanoic acid), lignoceric acid (tetracosanoic acid), palmitoleic acid ((Z)-9-hexadecenoic acid), oleic acid ((Z)-9-hexadecenoic acid), elaidic acid ((E)-9-octadecenoic acid), cis-vaccenic acid ((Z)-11-octadecenoic acid), linoleic acid ((9Z,12Z)-9,12-octadecadienoic acid), alpha-linolenic acid ((9Z,12Z,15Z)-9,12,15-octadecatrienoic acid), gamma-linolenic acid ((6Z,9Z,12Z)-6,9,12-octadecatrienoic acid), di-homo-gamma-linolenic acid ((8Z,11Z,14Z)-8,11,14-eicosatrienoic acid), arachidonic acid ((5Z,8Z,11Z,14Z)-5,8,11,14-eicosatetraenoic acid), erucic acid ((Z)-13-docosenoic acid), nervonic acid ((Z)-15-tetracosenoic acid), ricinoleic acid, hydroxystearic acid and undecenylic acid, and also mixtures thereof.

A surfactant TD of formula (I) where x is =1 and Y is =O—CH$_2$—CH(OR$^3$)—CH$_2$OH is preferably selected from the group consisting of mono- or diglycerides, more preferably mono- and diglycerides of straight-chain saturated or unsaturated fatty acids having up to 30 carbon atoms such as, for example, butyric acid (butanoic acid), caproic acid (hexanoic acid), caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachidic acid (eicosanoic acid) behenic acid (docosanoic acid), lignoceric acid (tetracosanoic acid), palmitoleic acid ((Z)-9-hexadecenoic acid), oleic acid ((Z)-9-hexadecenoic acid), elaidic acid ((E)-9-octadecenoic acid), cis-vaccenic acid ((Z)-11-octadecenoic acid), linoleic acid ((9Z,12Z)-9,12-octadecadienoic acid), alpha-linolenic acid ((9Z,12Z,15Z)-9,12,15-octadecatrienoic acid), gamma-linolenic acid ((6Z,9Z,12Z)-6,9,12-octadecatrienoic acid), di-homo-gamma-linolenic acid ((8Z,11Z,14Z)-8,11,14-eicosatrienoic acid), arachidonic acid ((5Z,8Z,11Z,14Z)-5,8,11,14-eicosatetraenoic acid), erucic acid ((Z)-13-docosenoic acid), nervonic acid ((Z)-15-tetracosenoic acid), ricinoleic acid, hydroxystearic acid and undecenylic acid, and also mixtures thereof.

A surfactant TD of formula (I) where x is =1 and Y is =NR$^1$R$^2$ is preferably selected from the group consisting of fatty acid amides of a mono- or dialkanolamine, more preferably of diisopropanolamine or of diethanolamine. Acid amides are obtainable according to the methods known in the prior art, for example as described in DE 1802500; DE 1802503, DE 1745443, DE 1745459 or U.S. Pat. No. 3,578,612. The corresponding carboxylic acids can be used here as raw materials, for example, and amide formation take place by elimination of water. Carboxylic esters, such as methyl esters for example, can similarly be used, in which case methanol is eliminated. Particular preference is given to the use of glycerides from the naturally occurring fats and oils, in which case the glycerol formed in the course of the amidation may be left in the reaction mixture. Similarly, for example in the reaction of triglycerides with amines, the reaction mixture may further comprise di- and monoglycerides provided the reaction conditions were chosen accordingly. When carboxylic esters are used, corresponding catalysts such as, for example, alkoxides are optionally employed to make possible an amidation under relatively mild conditions as compared with the abovementioned elimination of water. When higher functional amines (diethylenetriamine (DETA), 2-(2-aminoethylamino)ethanol (AEEA), tris(hydroxymethyl)-aminomethane (TRIS)) are used, the preparation of the amides may also result in the formation of corresponding cyclic amides such as imidazolines or oxazolines.

When a basic catalyst is used in the amidation, it may be advantageous to subsequently effect a neutralization with a corresponding amount of an organic or inorganic acid. Suitable compounds are known to a person skilled in the art.

The amides prepared by basic catalysis are more preferably neutralized with organic anhydrides of dicarboxylic acids, since these are able to react with the available OH or NH functions to thereby become attached and accordingly cannot evolve later from the ready-produced foam in the form of free carboxylic acids. In addition, for example when alkali metal alkoxides are used, corresponding esters are then formed in the neutralization, and therefore the free alcohols cannot escape from the system.

Preferred organic anhydrides are cyclic anhydrides such as, for example, succinic anhydride, maleic anhydride, alkylsuccinic anhydrides, such as dodecylsuccinic anhydride or polyisobutylenesuccinic anhydride, similarly suitable are adducts of maleic anhydride onto corresponding polyolefins such as, for example, polybutadienes, copolymers of maleic anhydride and olefins, styrene-maleic anhydride copolymers, vinyl ether-maleic anhydride copolymers, and also generally copolymers wherein maleic anhydride is comprised as a monomer, phthalic anhydride, benzophenonetetracarboxylic dianhydride, pyromellitic dianhydride, itaconic anhydride or similar structures. Examples of commercially available anhydrides of this type are the Poylvest® grades from Evonik Degussa GmbH or Ricon® MA grades from Sartomer.

The reaction steps may all be carried out without a solvent or else in a suitable solvent. When a solvent is used, the "active substance" content may be in the range from 10% to 99% by mass, preferably from 20% to 98% by mass, more preferably from 30% to 97% by mass based on the overall composition.

Useful carboxylic acids for preparing the surfactants of formula (I) where x is =1 include, for example, monocarboxylic acids, dicarboxylic acids, tricarboxylic acids, tetracarboxylic acids based on aliphatic or aromatic hydrocarbons or derivatives thereof.

Examples of alkyl moieties derived from monocarboxylic acids include methyl, ethyl, propyl, butyl, pentyl, hexyl, heptyl, octyl, nonyl or decyl, and the like, the preference here being for 2-ethylhexanoic acid, nonanoic acid, isononanoic acid.

Examples of alkenyl groups include ethenyl, propenyl, butenyl, pentenyl, hexenyl, heptenyl, octenyl, nonenyl, decenyl, and the like.

Examples of aromatic acids include aryl and alkylaryl (alkylaryl is defined as an aryl-substituted alkyl or arylalkyl group), for example phenyl, alkyl-substituted phenyl, naphthyl, alkyl-substituted naphthyl, tolyl, benzyl, dimethylphenyl, trimethylphenyl, phenylethyl, phenylpropyl, phenylbutyl, propyl-2-phenylethyl, salicyl and the like.

Aromatic dicarboxylic acids may be, for example, isophthalic acid, terephthalic acid or phthalic acid. Useful aliphatic dicarboxylic acids include, for example, succinic acid, malonic acid, adipic acid, dodecanedicarboxylic acid, maleic acid, fumaric acid, itaconic acid, citraconic acid, mesaconic acid, tartaric acid, malic acid, malonic acid, glutaric acid, adipic acid, pimelic acid, suberic acid, azelaic acid, sebacic acid, citric acid.

Useful higher functional acids include for example trimesic acid, pyromellitic acid, benzophenonetetracarboxylic acid.

Preferred acids are straight-chain saturated or unsaturated fatty acids having up to 40 carbon atoms such as, for example, butyric acid (butanoic acid), caproic acid (hexanoic acid), caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachidic acid (eicosanoic acid) behenic acid (docosanoic acid), lignoceric acid (tetracosanoic acid), palmitoleic acid ((Z)-9-hexadecenoic acid), oleic acid ((Z)-9-hexadecenoic acid), elaidic acid ((E)-9-octadecenoic acid), cis-vaccenic acid ((Z)-11-octadecenoic acid), linoleic acid ((9Z,12Z)-9,12-octadecadienoic acid), alpha-linolenic acid ((9Z,12Z,15Z)-9,12,15-octadecatrienoic acid), gamma-linolenic acid ((6Z,9Z,12Z)-6,9,12-octadecatrienoic acid), di-homo-gamma-linolenic acid ((8Z,11Z,14Z)-8,11,14-eicosatrienoic acid), arachidonic acid ((5Z,8Z,11Z,14Z)-5,8,11,14-eicosatetraenoic acid), erucic acid ((Z)-13-docosenoic acid), nervonic acid ((Z)-15-tetracosenoic acid), ricinoleic acid, hydroxystearic acid and undecenylic acid, and also mixtures thereof, e.g., rapeseed oil acid, soya fatty acid, sunflower fatty acid, peanut fatty acid and tall oil fatty acid. It is further possible to use dimeric and oligomeric fatty acids as formed in the oligomerization of unsaturated fatty acids.

Sources of suitable fatty acids or fatty acid esters particularly glycerides can be vegetable or animal fats, oils or waxes. There can be used for example: dripping, beef tallow, goose fat, duck fat, chicken fat, horse fat, whale oil, fish oil, palm oil, olive oil, avocado oil, seed kernel oils, coconut oil, palm kernel oil, cocoa butter, cottonseed oil, pumpkin seed oil, maize germ oil, sunflower oil, wheat germ oil, grape seed oil, sesame oil, linseed oil, soya bean oil, peanut oil, lupene oil, rapeseed oil, mustard oil, castor oil, jetropa oil, walnut oil, jojoba oil, lecithin e.g. based on soya, rapeseed or sunflowers, bone oil, neat's-foot oil, borage oil, lanolin, emu oil, deer tallow, marmoset oil, mink oil, borage oil, thistle oil, hemp oil, pumpkin oil, evening primrose oil, tall oil, and also carnauba wax, bees wax, candellila wax, ouricury wax, sugar cane wax, retamol wax, caranday wax, raffia wax, esparto wax, alfalfa wax, bamboo wax, hemp wax, Douglas fir wax, cork wax, sisal wax, flax wax, cotton wax, dammar wax, tea wax, coffee wax, rice wax, oleander wax, bees wax or wool wax.

Hydroxylamines useful for preparing the compounds of formula (I) where x is =1 and having at least one OH function include, for example, diethanolamine, monoethanolamine, diisopropanolamine, isopropanolamine, diglycolamine (2-(2-aminoethoxy)ethanol), 3-amino-1-propanol and polyetheramines such as Polyetheramin D 2000 (BASF), Polyetheramin D 230 (BASF), Polyetheramin T 403 (BASF), Polyetheramin T 5000 (BASF) or else corresponding Jeff-Amin® grades from Huntsman.

Compounds of formula (I) where x=is 1 useful for the purposes of the present invention may also be commercially available amides having OH or NH functions, for example from Evonik Goldschmidt: Rewomid® DC 212 S, Rewomid® DO 280 SE, Rewocid® DU 185 SE, Rewolub® KSM, REWOMID® C 212, REWOMID® IPP 240, REWOMID® SPA, Rewopon® IM AO, Rewopon® IM AN or Rewopon® IM R 40, and also DREWPLAST® 154, NINOL® 1301, NINOL® 40-CO, NINOL® 1281, NINOL® COMF, NINOL® M-10 and ethoxylated diethanolamides such as NINOL® C-4 I, NINOL® C-5, NINOL® 1301 from Stepan or DACAMID® MAL and DACAMID® DC from Sasol.

The amidation is preferably carried out with a deficiency of amine, and so there is ideally little if any free amine present in the end product. Since amines in general do not have advantageous toxicological properties on account of their irritating or caustic effect, any minimization of amine fractions is desirable and advantageous. Preferably, the amine fractions in the admixture used according to the present invention, more particularly the fractions attributable to compounds bearing primary and secondary amino groups, are less than 5 wt %, more preferably below 3 wt % and even more preferably less than 1 wt % based on the sum total of amines and amides.

The method of the present invention utilizes a composition (ZP) at least comprising at least one polyol and at least one catalyst that catalyzes the formation of a urethane, urea or isocyanurate bond.

The polyol used in the present invention differs from the TD surfactants used. Suitable polyols for the purposes of this invention are any compounds known per se to a person skilled in the art. Preferred polyols are any polyester polyols and polyether polyols typically used in the manufacture of polyurethane foams. The properties stipulated for the foams determine which are the appropriate polyols to be used, as described for example in: US 2007/0072951 A1, WO 2007/111828 A2, US 2007/0238800, U.S. Pat. No. 6,359,022 B1 or WO 96 12759 A2. Similarly, preferentially usable polyols based on vegetable oil are described in various patent documents, for example in WO 2006/094227, WO 2004/096882, US 2002/0103091, WO 2006/116456 and EP 1 678 232.

The polyether alcohols used according to the present invention are typically used in admixture with other compounds having two or more isocyanate-reactive hydrogen atoms. As compounds having two or more isocyanate-reactive hydrogen atoms and usable conjointly with the polyether alcohols used according to the present invention there may be considered in particular polyether alcohols and/or polyester alcohols having OH numbers in the range from 100 to 1200 mgKOH/g. The polyester alcohols used conjointly with the polyether alcohols used according to the present invention are mostly prepared by condensation of polyfunctional alcohols, preferably diols, having 2 to 12 carbon atoms, preferably 2 to 6 carbon atoms, with polyfunctional carboxylic acids having 2 to 12 carbon atoms, for example succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthlenedicarboxylic acids.

The further polyether alcohols used conjointly with the polyether alcohols used according to the present invention usually have a functionality between 2 and 8, in particular from 3 to 8.

Polyether alcohols used are in particular polyether alcohols prepared according to known methods, for example by anionic polymerization of alkylene oxides in the presence of catalysts, preferably amines and/or alkali metal hydroxides.

The alkylene oxides used are usually ethylene oxide and/or propylene oxide. Useful starter molecules include, in particular, compounds having at least 2, preferably from 4 to 8 hydroxyl groups or having two or more primary amino groups in the molecule.

Suitable starter molecules are for example selected from the group comprising aniline, EDA, TDA, MDA and PMDA, more preferably from the group comprising TDA and PMDA. TDA is used in particular. When TDA is used, all isomers can be used alone or in any desired mixtures with each or one another. Particularly 2,4-TDA, 2,6-TDA, mixtures of 2,4-TDA and 2,6-TDA, 2,3-TDA, 3,4-TDA, mixtures of 3,4-TDA and 2,3-TDA, and also mixtures of all the isomers mentioned can be used. 2,3-TDA and 3,4-TDA are frequently also referred to as ortho-TDA or as vicinal TDA. The TDA may be exclusively vicinal TDA. In a particularly preferred embodiment of the method according to the present invention, the TDA consists of vicinal TDA to an extent of not less than 90 wt %, more preferably not less than 95 wt % and especially not less than 99 wt %, all based on the weight of TDA.

By way of starter molecules having at least 2 and preferably from 3 to 8 hydroxyl groups in the molecule it is preferable to use trimethylolpropane, glycerol, pentaerythritol, castor oil, sugar compounds such as, for example, glucose, sorbitol, mannitol and sucrose, polyhydric phenols, resols, for example oligomeric condensation products of phenol and formaldehyde and Mannich condensates of phenols, formaldehyde and dialkanolamines, and also melamine. The polyether alcohols have a functionality of preferably 2 to 8 and hydroxyl numbers of preferably 100 mgKOH/g to 1200 mgKOH/g and especially 120 mgKOH/g to 570 mgKOH/g.

In a further embodiment, the present invention accordingly provides a method of producing polyurethane or polyisocyanurate foams as described above wherein the at least one polyol is selected from the group consisting of polyether alcohols and polyester alcohols.

Further suitable polyols are for example disclosed in WO 2011/134866 A2, WO 2011/134856 A1, EP 1 138 709 A1, WO 2006/037540 A2, DE 41 21 161 A1 and WO 2011/107374 A1.

The catalyst used to catalyze the formation of a urethane, urea or isocyanurate bond is preferably a catalyst suitable for the reactions between isocyanate-polyol and/or isocyanate-water and/or isocyanate trimerization. Suitable catalysts for the purposes of this invention are preferably catalysts that catalyze the gel reaction (isocyanate-polyol), the blowing reaction (isocyanate-water) and/or the di- and/or trimerization of the isocyanate. Typical examples of suitable catalysts are the amines triethylamine, dimethylcyclohexylamine, tetramethylethylene-diamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, N,N-dimethylbenzylamine, dimethylaminoethanol, dimethylaminoethoxyethanol and bis(dimethylaminoethyl) ether, tin compounds such as dibutyltin dilaurate, ammonium salts and potassium salts such as potassium acetate and potassium-2-ethylhexanoate. Suitable catalysts are recited for example in EP 1985642, EP 1985644, EP 1977825, US 2008/0234402, EP 0656382 B1, US 2007/0282026 A1 and the patent documents cited therein.

Preferred catalyst quantities present in composition (ZP) depend on the type of catalyst and are typically in the range from 0.05 to 5 parts by mass based on 100 parts by mass of composition (ZP) and/or 0.1 to 5 parts by mass based on 100 parts by mass of composition (ZP) for potassium and ammonium salts.

According to the present invention, the reaction of composition (Z1) with the polyisocyanate is carried out in the presence of a nucleating agent and of a blowing agent as described above wherein the nucleating agent differs from the blowing agent. The blowing agent is preferably a physical blowing agent, i.e., a volatile (boiling temperature below 100° C., preferably below 70° C.) liquid, or a gas. Preferred blowing agents are hydrocarbons having 4 or 5 carbon atoms, more preferably cyclopentane, isopentane and n-pentane, and also mixtures thereof, or saturated or unsaturated hydrofluorocarbons, more preferably 1,1,1,2-tetrafluoroethane (HFC-134a), 1,1,1,3,3-pentafluoropropane (HFC-245fa), 1,1,1,3,3-pentafluorobutane (HFC-365mfc), 1,1,1,2,3,3,3-heptafluoropropane (HFC-227ea), 1,1-difluoroethane (HFC-152a), trans-1,3,3,3,3-tetrafluoro-1-propene (HFO-1234zeE), 2,3,3,3-tetrafluoro-1-propene (HFO-1234yf), cis-1,1,1,4,4,4-hexafluoro-2-butene (HFO-1336mzz(Z)) and trans-1,1,1,4,4,4-hexafluoro-2-butene (HFO-1336mzz(E)), saturated or unsaturated hydrofluorochlorocarbons, more preferably 1,1-dichloro-1-fluoroethane (HCFC-141b) and trans-1-chloro-3,3,3-trifluoro-1-propene (HCFO-1233zd-(E)), oxygen-containing compounds, more preferably methyl formate or dimethoxymethane, or hydrochlorocarbons, more preferably 1,2-dichloroethane, or mixtures thereof.

The present invention further also provides a method of producing polyurethane or polyisocyanurate foams as described above wherein the blowing agent comprises at least one compound selected from the group comprising cyclopentane, isopentane, n-pentane, 1,1,1,2-tetrafluoroethane (HFC-134a), 1,1,1,3,3-pentafluoropropane (HFC-245fa), 1,1,1,3,3-pentafluorobutane (HFC-365mfc), 1,1,1,2,3,3,3-heptafluoropropane (HFC-227ea) 1,1-difluoroethane (HFC-152a), trans-1,3,3,3-tetrafluoro-1-propene (HFO-1234ze(E)), 2,3,3,3-tetrafluoro-1-propene (HFO-1234yf), cis-1,1,1,4,4,4-hexafluoro-2-butene (HFO-1336mzz(Z)), trans-1,1,1,4,4,4-hexafluoro-2-butene (HFO-1336mzz(E)), 1,1-dichloro-1-fluoroethane (HCFC-141b), trans-1-chloro-3,3,3-trifluoro-1-propene (HFO-1233zd-(E)), cis-1-chloro-3,3,3-trifluoropropene (HFO-1233zd(Z)), HCFO-12332d (E), methyl formate and dimethoxymethane.

The amounts in which a physical blowing agent is used preferentially depend on the density desired for the foam to be produced, and are typically in the range from 5 to 40 parts by mass based on 100 parts by mass of composition (ZP).

Chemical blowing agents, which react with isocyanates by evolving a gas, examples being water or formic acid, may be included in addition to physical blowing agents. Blowing agents falling within the hereinbelow following definition of the nucleating agents in the composition are preferably excluded.

A nucleating agent as used for the purposes of the present invention is at least one compound selected from the group comprising perfluorinated hydrocarbons, ethers having at least one perfluorinated hydrocarbyl moiety and ketones having at least one perfluorinated hydrocarbyl moiety.

The perfluorinated hydrocarbons may be saturated or unsaturated, linear, branched or cyclic. They may also comprise oxygen atoms, for example in the form of alcohol, ether, carbonyl or carboxyl groups.

Preferred nucleating agents for the purposes of the present invention are perfluorinated hydrocarbons, more preferably perfluoropentane $C_5F_{12}$, perfluorohexane $C_6F_{14}$, perfluorocyclohexane $C_6F_{12}$, perfluoroheptane $C_7F_{16}$ and perfluorooctane $C_8F_{18}$.

Other preferred classes of chemicals are perfluorinated olefins and also their dimers and oligomers, more preferably olefins having the empirical formulae $C_5F_{10}$, $C_6F_{12}$, $C_7F_{14}$ and $C_8F_{16}$, yet more preferably the dimer of 1,1,2,3,3,3-hexafluoro-1-propene, in particular 1,1,1,2,3,4,5,5,5-nonafluoro-4-(trifluoromethyl)pent-2-ene or 1,1,1,3,4,4,5,5,5-nonafluoro-2-(trifluoromethyl)pent-2-ene or mixtures thereof.

In a further embodiment, the present invention accordingly provides a method of producing polyurethane or polyisocyanurate foams as described above wherein the nucleating agent is at least one compound selected from the group consisting of perfluorinated hydrocarbons and ethers having at least one perfluorinated hydrocarbyl moiety.

In a further embodiment, the present invention provides a method of producing polyurethane or polyisocyanurate foams as described above wherein the nucleating agent is selected from the group consisting of perfluoropentane $C_5F_{12}$, perfluorohexane $C_6F_{14}$, perfluorocyclohexane $C_6F_{12}$, perfluoroheptane $C_7F_{16}$, perfluorooctane $C_8F_{18}$, and/or one or more perfluorinated olefins of the empirical formulae $C_5F_{10}$, $C_6F_{12}$, $C_7F_4$, $C_8F_{16}$, dimers of 1,1,2,3,3,3-hexafluoro-1-propene, methoxyheptafluoropropane, methoxynonafluorobutane and/or ethoxynonafluorobutane.

When an ether having at least one perfluorinated hydrocarbyl moiety is used as a nucleating agent, it is preferably a methyl or ethyl ether of a perfluorinated hydrocarbyl moiety, more preferably methoxyheptafluoropropane, methoxynonafluorobutane, ethoxyheptafluoropropane or ethoxynonafluorobutane.

The nucleating agent should preferably have a boiling temperature (under atmospheric pressure) in the range from −20° C. to 150° C., preferably in the range from 0° C. to 120° C., more preferably in the range from 20° C. to 100° C.

The amount of nucleating agent used is preferably in the range from 0.1 to 10 parts by mass, more preferably from 0.2 to 5 parts by mass and yet more preferably from 0.5 to 3 parts by mass based on 100 parts by mass of composition (ZP).

In a further embodiment, the present invention accordingly provides a stabilized composition (ZS) as described above wherein the nucleating agent is employed in an amount ranging from 0.1 to 10 parts by mass based on 100 parts by mass of composition (ZP).

Preferred polyol components comprise sugar/glycerol and/or sugar-initiated, sorbitol-initiated and TDA-initiated polyols, more preferably vic-TDA-initiated polyols. Particularly preferred nucleating agents are perfluorinated olefins and compounds with perfluorinated moieties that have a keto or carbonyl function.

The method of the present invention may additionally utilize further components such as, for example, foam stabilizers, crosslinkers, flame retardants, fillers, dyes, antioxidants and thickeners/rheology additives. These further components are preferably not surfactants TD. The further components may be comprised in composition (ZS), (Z1), (Z2) and/or (ZP). The further components are preferably present in compositions (ZS), (Z1) and/or (ZP), preferably in compositions (ZS), (Z1) and (ZP), more preferably in composition (ZP).

Useful foam stabilizers include surface-active substances other than the TD surfactants, preferably silicone surfactants (polyether-polydimethylsiloxane copolymers). Usage levels of foam stabilizers, preferably polyethersiloxane foam stabilizers, are typically from 0.5 to 5 parts by mass per 100 parts by mass of composition (ZP), preferably from 1 to 3 parts by mass per 100 parts by mass of composition (ZP). Suitable silicone surfactants are described for example in EP 1873209, EP 1544235, DE 10 2004 001 408, EP 0839852, WO 2005/118668, US 20070072951, DE 2533074, EP 1537159, EP 533202, U.S. Pat. No. 3,933,695, EP 0780414, DE 4239054, DE 4229402 and EP 867464 and are for example marketed by Evonik Industries under the brand name of Tegostab®. The siloxanes are obtainable as described in the prior art. Particularly suitable examples of their preparation are described for example in U.S. Pat. No. 4,147,847, EP 0493836 and U.S. Pat. No. 4,855,379.

Any known flame retardants useful in the manufacture of polyurethane foams are usable for the purposes of the present invention. Suitable flame retardants for the purposes of this invention are preferably liquid organophosphorus compounds, such as halogen-free organic phosphates, e.g., triethyl phosphate (TEP), diphenyl cresyl phosphate (DPK), tricresyl phosphate (TPK), halogenated phosphates, e.g., tris(1-chloro-2-propyl) phosphate (TCPP) and tris(2-chloroethyl) phosphate (TCEP) and organic phosphonates, e.g., dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids, such as melamine and expandable graphite.

The flame retardants are preferably compounds comprising phosphorus and/or halogen, in particular bromine. However, flame retardants based on boron can also be used. The flame retardant is preferably selected from the group consisting of polybrominated compounds and organophosphorus compounds. Polybrominated compounds are any compounds comprising two or more bromine atoms per molecule. Preferred polybrominated compounds are particularly pentabromotoluene, pentabromophenyl allyl ether, pentabromoethylbenzene, decabromobiphenyl, pentabromodiphenyl oxide, octabromodiphenyl oxide, decabromodiphenyl oxide, ethylenebis(tetrabromophthalimide), tetradecabromodiphenoxybenzene, ester-ethers of tetrabromophthalic anhydride, tetrabromoneopentyl glycol and its derivatives.

Organophosphorus compounds are compounds comprising at least one phosphorus atom and at least one carbon atom, particularly organic phosphates, phosphonates, phosphinates, phosphites, phosphonites, phosphinites and phosphine oxides.

Preferred organophosphorus compounds for the purposes of the present invention are particularly those having a P═O double bond, in particular organophosphates, organophosphonates and organophosphine oxides. The prefix organo therein identifies the presence of an organic compound in the abovementioned sense, and is not restricted to the presence of a C—P bond. Organophosphate is to be understood as referring to organic compounds in which the P—OH groups of phosphoric acid are replaced by P—OR, where each R may be the same or different and independently of the others represents an organic moiety, in particular a hydrocarbyl group which may be aliphatic, araliphatic or aromatic and which may comprise further functional groups.

Organophosphonate is to be understood as meaning organic compounds in which the P—OH groups of phosphonic acid are replaced by P—OR and the P—H groups by P—R, where each R may be the same or different and independently of the others represents an organic moiety, in particular a hydrocarbyl group, which may be aliphatic, araliphatic or aromatic and which may comprise further functional groups. Organophosphine oxide is to be understood as referring to organic compounds of the structure $R_3P=O$, where each R may be the same or different and independently of the others represents an organic moiety, in particular a hydrocarbyl group, which may be aliphatic, araliphatic or aromatic and which may comprise further functional groups.

Preferred organophosphoric acid derivatives are those of the structure $OP(OR)_3$, where each R is independently of the others an aliphatic, araliphatic or aromatic hydrocarbyl group which has from 1 to 20 carbon atoms and which may bear further functional groups, for example ether linkages, halogen atoms and also isocyanate-reactive groups, in particular OH groups and/or $NH_2$ groups. Preferred organophosphates are particularly triaryl and trialkyl phosphates such as diphenyl cresyl phosphate, tricresyl phosphate, triethyl phosphate, 2-ethylhexyl diphenyl phosphate and 1,3-phenylenetetraphenyl phosphate and also tris(2-chloropropyl) phosphate.

Preferred organophosphates are those of the structure $RPO(OR)_2$, where each R is independently of the others an aliphatic, araliphatic or aromatic hydrocarbyl group which has from 1 to 20 carbon atoms and which may bear further functional groups, for example ether linkages, halogen atoms and also isocyonate-reactive groups, in particular OH groups and/or $NH_2$ groups. Preferred organophosphonates are particularly triaryl and trialkyl phosphonates, diethyl N,N-bis(2-hydroxyethyl)aminomethylphosphonate, tetraalkyl diphosphonate compounds, dimethyl methanephosphonate, diethyl ethanephosphonate and the like, and also phosphorus polyols and alkoxylated alkylphosphonic acid derivatives.

Preferred organophosphine oxides are those of the structure $OPR_3$, where each R is independently of the others an aliphatic, araliphatic or aromatic hydrocarbyl group which has from 1 to 20 carbon atoms and which may bear further functional groups, for example ether linkages, halogen atoms and also isocyonate-reactive groups, for example ether linkages, halogen atoms and also isocyonate-reactive groups in particular OH groups and/or NH groups. Preferred organophosphine oxides are particularly bis(hydroxymethyl)isobutylphosphine oxide, bis(3-hydroxypropyl) isobutylphosphine oxide, triethylphosphine oxide, dimethyldecylphosphine oxide, tributylphosphine oxide, tris(2-ethylhexyl)phosphine oxide, methyldiphenylphosphine oxide, trioctylphosphine oxide, triphenylphosphine oxide and tris(2-methylphenyl)phosphine oxide.

Aforementioned flame retardants are usable singly or as a combination of two or more thereof. Flame retardants may comprise one or more functional groups as further elaborated above.

Particularly preferred flame retardants are the following: tris(2-chloro-1-methylethyl) phosphate, diethyl ethylphosphonate, dimethyl propylphosphonate, tri(isopropylphenyl) phosphate (Reofos 95), oligomeric chloroalkyl phosphate esters (Fyrol 99), resorcinol bis(diphenyl phosphate)s, 2-(2-hydroxyethoxy)ethyl 2-hydroxypropyl 3,4,5,6-tetrabromophthalate, bis(hydroxymethyl)isobutylphosphine oxide, bis(3-hydroxypropyl)isobutylphosphine oxide and trioctylphosphine oxide.

By way of further additives it is also possible for the purposes of the present invention to utilize further compounds known according to the prior art, examples being polyethers, nonylphenol ethoxylates or nonionic surfactants which are not surfactants as per the definition for the TD surfactants.

The present invention also provides a kit for preparing a stabilized composition (ZS) for producing a polyurethane or polyisocyanurate foam, said kit consisting of a composition (Z1) and a composition (Z2), and also a stabilized composition (ZS) as described above. Preferred components of the particular compositions of the kit and/or of the stabilized composition (ZS) are the preferred compounds described above in connection with the method of the present invention.

The stabilized compositions (ZS) of the present invention are, for example, useful in the manufacture of polyurethane or polyisocyanurate foams, in particular rigid foams. To this end, a stabilized composition (ZS) of the present invention is reacted, in particular foamed, with an isocyanate component. In fact, the isocyanate component may be added to the stabilized composition directly, for example shortly before the actual reaction. Preferably, however, the stabilized composition (ZS) is reacted with a separately stored isocyanate component.

In the context of the present invention, any suitable polyisocyanate is employable in the method of the present invention. Any isocyanate compounds usable in the manufacture of polyurethane foams, in particular rigid polyurethane or polyisocyanurate foams, are usable as isocyanate component. The isocyanate component preferably comprises one or more organic isocyanates having two or more isocyanate functions.

The polyfunctional isocyanates are particularly also employable as mixtures. Contemplated polyfunctional isocyanates have two (hereinafter referred to as diisocyanates) or more than two isocyanate groups per molecule.

Specific examples are 2,4- and 2,6-tolylene diisocyanate (TDI) and the corresponding isomeric mixtures, 4,4'-, 2,4'- and 2,2'-diphenylmethane diisocyanate (MDI) and the corresponding isomeric mixtures, mixtures of 4,4'- and 2,4'-diphenylmethane diisocyanates and, in the manufacture of rigid polyurethane foams, particularly mixtures of 4,4'-, 2,4'- and 2,2'-diphenylmethane diisocyanates and polyphenyl polymethylene polyisocyanates (crude MDI).

Of particular suitability are 2,2'-, 2,4'- and/or 4,4'-diphenylmethane diisocyanate (MDI), 1,5-naphthylene diisocyanate (MDI), 2,4- and/or 2,6-tolylene diisocyanate (TDI), 3,3'-dimethyl-biphenyl diisocyanate, 1,2-diphenylethane diisocyanate and/or p-phenylene diisocyanate (PPDI), tri-, tetra-, penta-, hexa-, hepta- and/or octamethylene diisocyanate, 2-methylpenta-methylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), 1,4-cyclohexane diisocyanate, 1-methyl-2,4- and/or -2,6-cyclohexane diisocyanate and 4,4'-, 2,4'- and/or 2,2'-dicyclohexylmethane diisocyanate. Aromatic isocyanates are preferable for use as polyfunctional isocyanates. The following are particularly preferable for use as polyfunctional isocyanates:

i) polyfunctional isocyanates based on tolylene diisocyanate (TDI), in particular 2,4-TDI or 2,6-TDI or mixtures of 2,4- and 2,6-TDI;

ii) polyfunctional isocyanates based on diphenylmethane diisocyanate (MDI), in particular 2,2'-MDI or 2,4'-MDI or 4,4'-MDI or oligomeric MDI, which is also known as polyphenyl polymethylene isocyanate, or mixtures of two or three of the aforementioned diphenylmethane diisocyanates, or crude MDI, which is generated in the production of MDI, or mixtures of at least one oligomer of MDI and at least one of the aforementioned low molecular weight MDI derivatives;

iii) mixtures of at least one aromatic isocyanate as per embodiment i) and at least one aromatic isocyanate as per embodiment ii).

Oligomeric diphenylmethane diisocyanate is particularly preferable for use as polyfunctional isocyanate. Oligomeric diphenylmethane diisocyanate (hereinafter referred to as oligomeric MDI) comprises a mixture of two or more oligomeric condensation products and thus derivatives of diphenylmethane diisocyanate (MDI). Polyfunctional isocyanates may preferably also be constructed from mixtures of monomeric aromatic diisocyanates and oligomeric MDI.

Oligomeric MDI comprises one or more polynuclear condensation products of MDI having a functionality of more than 2, especially 3 or 4 or 5. Oligomeric MDI is known and is frequently also referred to as polyphenyl polymethylene isocyanate or else as polymeric MDI. Oligomeric MDI is typically constructed from a mixture of MDI-based isocyanates of differing functionality. Oligomeric MDI is typically used in admixture with monomeric MDI. The (average) functionality of an isocyanate comprising oligomeric MDI may vary in the range from about 2.2 to about 5, in particular from 2.4 to 3.5, in particular from 2.5 to 3. Such a mixture of MDI-based polyfunctional isocyanates having different functionalities is particularly the crude MDI formed in the course of the production of MDI, typically catalyzed by hydrochloric acid, as an intermediate in the production of crude MDI.

Polyfunctional isocyanates or mixtures of two or more polyfunctional isocyanates based on MDI are known and available for example from BASF Polyurethanes GmbH under the name of Lupranat®.

The present invention accordingly further provides a method of producing polyurethane or polyisocyanurate foams as described above wherein the at least one polyisocyanate is selected from the group consisting of aromatic polyisocyanates.

Examples of suitable isocyanates are recited in EP 1 712 578 A1, EP 1 161 474, WO 058383 A1, US 2007/0072951 A1, EP 1 678 232 A2 and WO 2005/085310. The ratio of polyol to isocyanate, expressed as the index, is preferably in the range from 100 to 450, more preferably from 100 to 150, for the purposes of the present invention. This index describes the ratio of actually employed isocyanate to computed isocyanate (for a stoichiometric reaction with polyol). An index of 100 stands for a molar ratio of 1:1 between the reactive groups.

Suitable reaction conditions for the step of reacting composition (Z1) and/or stabilized composition (ZS) with the polyisocyanate are known to a person skilled in the art.

The method for producing polyurethane foams, in particular rigid polyurethane foams, in the manner of the present invention is performable according to the known procedures, for example by hand mixing or preferably by means of foaming machines. When the method is performed using a foaming machine, high-pressure or low-pressure machines are usable. The method of the present invention may be carried out in a continuous manner as well as batchwise.

A comprehensive survey of the state of the art, the raw materials which can be used and methods which can be used is found in "Ullmann's Encyclopedia of Industrial Chemistry" Vol. A21, VCH, Weinheim, 4th edition 1992, pp. 665 to 715.

Usage of the stabilized composition (ZS) of the present invention in the manufacture of rigid polyurethane foams and/or the method of the present invention provide advantageous polyurethane foams.

The present invention accordingly also provides a polyurethane or polyisocyanurate foam obtained or obtainable by a method as described above. The present invention also provides a polyurethane or polyisocyanurate foam obtained or obtainable by using a kit as described above.

The polyurethane foams of the present invention have good thermally insulating properties in particular.

A preferred rigid polyurethane and/or polyisocyanurate foam formulation within the meaning of this invention gives a density of 20 to 150 kg/m$^3$ and preferably has the composition itemized in table 2.

TABLE 2

Composition of rigid polyurethane and/or polyisocyanurate foam formulation of the invention

| Composition | | | Component | Parts by weight |
|---|---|---|---|---|
| ZS | Z1 | ZP | polyol | 10-98 |
| | | | amine catalyst | 0.05 to 5 |
| | | | potassium trimerization catalyst | 0 to 5 |
| | | | foam stabilizer | 0.5 to 5 |
| | | | water | 0.1 to 5 |
| | | | flame retardant | 0 to 50 |
| | | | | sum total 100 |
| | Z2 | TD | surfactants | 0.05 to 10 |
| | | | blowing agent | 5 to 40 |
| | | | nucleating agent | 0.1 to 10 | isocyanate index: 80-500

The polyurethane foams, in particular rigid polyurethane foams, of the present invention, which comprise at least one surfactant TD as defined above and/or a reaction product of surfactant TD with an isocyanate component, and at least one nucleating agent as defined above, are notable for the mass ratio of nucleating agent to these surfactants TD being in the range from 10:1 to 1:10, preferably in the range from 5:1 to 1:5, more preferably in the range from 3:1 to 1:3. The polyurethane foams, in particular rigid polyurethane or polyisocyanurate foams, of the present invention preferably comprise from 0.03% to 5% by mass, preferably from 0.3% to 2.5% by mass and more preferably from 0.75% to 1.35% by mass of surfactant TD in bound and/or unbound form.

The present invention also provides polyurethane or polyisocyanurate foams comprising at least one surfactant TD as defined above and/or a reaction product of surfactant TD with an isocyanate component and at least one nucleating agent as defined above wherein the mass ratio of nucleating agents to surfactants TD is in the range from 10:1 to 1:10.

Preferred polyurethane foams, in particular rigid polyurethane foams, of the present invention, which are obtained by the method of the present invention or the use of stabilized composition (ZS) of the present invention, typically have, when measured in the fresh (i.e., cured at room temperature for 24 h) state at 23° C., a thermal conductivity below 21 mW/m·K, preferably below mW/m·K, as determined using a "Lambda Control" 2 plate thermal conductivity measuring instrument from Hesto.

The polyurethane foams (polyurethane or polyisocyanurate foams), in particular rigid polyurethane foams, of the present invention are useful as or in the manufacture of insulation materials, preferably insulation panels, sandwich elements, hot water storage systems, boilers, cooling apparatus, insulation foams, refrigerators or freezers.

The present invention accordingly also provides the method of using a polyurethane or polyisocyanurate foam as described above as or in the manufacture of insulation materials, preferably insulation panels, sandwich elements, hot water storage systems, boilers, cooling apparatus, insulation foams, refrigerators or freezers.

The present invention further provides an insulation panel, a sandwich element, a hot water storage system, a boiler, a cooling apparatus, an insulation foam, a refrigerator or a freezer comprising a polyurethane foam as described above.

Cooling apparatus according to the present invention comprises a polyurethane foam (polyurethane or polyisocyanurate foam), in particular rigid polyurethane foam, of the present invention as insulation material.

The present invention also provides the method of using at least one surfactant TD, having an HLB value below 10 and no silicon atom, to stabilize a composition at least comprising at least one polyol and at least one nucleating agent selected from the group consisting of perfluorinated hydrocarbons, ethers having at least one perfluorinated hydrocarbyl moiety and ketones having at least one perfluorinated hydrocarbyl moiety, wherein the sum total of surfactants TD in the composition comprises from 0.05 to 10 parts by mass in 100 parts by mass of composition (ZP).

Exemplary embodiments of the present invention are itemized hereinbelow, which do not restrict the present invention. More particularly, the present invention also comprises such embodiments as are derivable from the dependency references and hence combinations hereinbelow.

1. A method of producing polyurethane or polyisocyanurate foams which comprises the step of reacting
    (a) a composition (Z1), comprising
        (i) a composition (ZP) at least comprising a polyol and a catalyst that catalyzes the formation of a urethane, urea or isocyanurate bond, and
        (ii) a surfactant TD having an HLB value below 10 and no silicon atom, wherein the sum total of surfactants TD in the stabilized composition comprises from 0.05 to 10 parts by mass per 100 parts by mass of the composition (ZP),
    (b) with at least one polyisocyanate,
    wherein the step of reacting takes place in the presence of a nucleating agent selected from the group consisting of perfluorinated hydrocarbons, ethers having at least one perfluorinated hydrocarbyl moiety and ketones having at least one perfluorinated hydrocarbyl moiety, and of a blowing agent, wherein the nucleating agent differs from the blowing agent, and
    wherein the nucleating agent and the blowing agent are mixed to obtain a composition (Z2) and said composition (Z2) is added to said composition (Z1) before the step of reacting with the at least one polyisocyanate.

2. The method according to embodiment 1 wherein said surfactant TD is at least one compound of formula (I),

where C(O) is a carbonyl group, x is =0 or 1, R is a linear, branched or cyclic, saturated or unsaturated hydrocarbyl moiety, having at least 4, preferably from 8 to 30, more preferably from 9 to 20 and yet more preferably from 9 to 18 carbon atoms, and Y is =O—$R^1$ or $NR^1R^2$ or O—$CH_2$—CH(OR)—$CH_2OH$, each with $R^1$ and $R^2$ being identical or different $(C_nH_{2n}O)_m$—H moieties, where n is =2 to 4, preferably n is =2 to 3, more preferably n is =2, and also m is =0-15, preferably m is =0-10, more preferably m is =0 or 1-6, and with $R^3$ being =H or R' or C(O)R', where R' is a hydrocarbyl moiety as defined for R and may be the same as or different from the R moiety.

3. The method according to either of embodiments 1 and 2 wherein said surfactant TD is isotridecanol or isononanol.

4. The method according to any of embodiments 1 to 3 wherein the nucleating agent is at least one compound selected from the group consisting of perfluorinated hydrocarbons and ethers having at least one perfluorinated hydrocarbyl moiety.

5. The method according to any of embodiments 1 to 4 wherein the nucleating agent is employed in an amount ranging from 0.1 to 10 parts by mass based on 100 parts by mass of composition (ZP).

6. The method according to any of embodiments 1 to 5 wherein the nucleating agent is selected from the group consisting of perfluoropentane $C_5F_{12}$, perfluorohexane $C_6F_{14}$, perfluorocyclohexane $C_6F_{12}$, perfluoroheptane $C_7F_{16}$, perfluorooctane $C_8F_{18}$, and/or one or more perfluorinated olefins of the empirical formulae $C_5F_{10}$, $C_6F_{12}$, $C_7F_{14}$, $C_8F_{16}$, dimers of 1,1,2,3,3,3-hexafluoro-1-propene, methoxyheptafluoropropane, methoxynonafluorobutane and/or ethoxynonafluorobutane.

7. The method according to any of embodiments 1 to 6 wherein the at least one polyol is selected from the group consisting of polyether alcohols and polyester alcohols.

8. The method according to any of embodiments 1 to 7 wherein the at least one polyisocyanate is selected from the group consisting of aromatic polyfunctional isocyanates.

9. A kit for preparing a stabilized composition (ZS) for producing a polyurethane or polyisocyanurate foam, said kit consisting of
    (I) a composition (Z1) at least comprising
        a composition (ZP) comprising at least one polyol and at least one catalyst that catalyzes the formation of a urethane, urea or isocyanurate bond, and a surfactant TD having an HLB value below 10 and no silicon atom, wherein the sum total of surfactants TD in the stabilized composition comprises from 0.05 to 10 parts by mass per 100 parts by mass of the composition (ZP), and
    (II) a composition (Z2) at least comprising
        a nucleating agent selected from the group consisting of perfluorinated hydrocarbons, ethers having at least one perfluorinated hydrocarbyl moiety and ketones having at least one perfluorinated hydrocarbyl moiety, and a blowing agent, wherein the nucleating agent differs from the blowing agent.

10. A stabilized composition (ZS) at least comprising
    (a) at least one composition (ZP) at least comprising at least one polyol and at least one catalyst that catalyzes the formation of a urethane, urea or isocyanurate bond,
    (b) at least one surfactant TD having an HLB value below 10 and no silicon atom, wherein the sum total of surfactants TD in the composition comprises from 0.05 to 10 parts by mass per 100 parts by mass of the composition (ZP),
    (c) at least one nucleating agent selected from the group consisting of perfluorinated hydrocarbons, ethers having at least one perfluorinated hydrocarbyl moiety and ketones having at least one perfluorinated hydrocarbyl moiety,
(d) at least one blowing agent, wherein the blowing agent differs from the nucleating agent,
wherein said composition (ZS) is a phase-stable liquid in that said composition (ZS) to the naked eye does not consist of two or more phases at an ambient temperature of 20° C.

11. A polyurethane or polyisocyanurate foam obtainable or obtained by a method according to any of embodiments 1 to 8 or by using a stabilized composition (ZS) according to embodiment 9 or 10.

12. The method of using a polyurethane or polyisocyanurate foam according to embodiment 11 as or in the manufacture of insulation materials, preferably insulation panels, sandwich elements, hot water storage systems, boilers, cooling apparatus, insulation foams, refrigerators or freezers.

13. An insulation panel, a sandwich element, a hot water storage system, a boiler, a cooling apparatus, an insulation foam, a refrigerator or a freezer comprising a polyurethane foam according to embodiment 11 as insulation material.

Illustrative embodiments of the present invention will now be described by way of example without any intention that the invention, the scope of which is apparent from the claims and the entire description, shall be restricted to the exemplary embodiments.

EXAMPLES

1. General Procedures 1.1 Measurement of Hydroxyl Number

Hydroxyl numbers were determined to DIN53240.

1.2 Preparation of Stabilized Composition (ZS)

The stabilized composition is obtained as follows:
A composition (ZP) consisting of polyol mix, catalyst mixture, stabilizer and water in the amounts indicated in the examples is prepared by mixing the constituents and then initially charged. The surfactant TD is, as described in the examples, added under agitation to obtain composition Z1. Composition Z2 consisting of the nucleating agent and the blowing agent as indicated in the examples is likewise obtained by mixing the constituents. Z2 is admixed to Z1 under agitation to obtain stabilized composition (ZS). Compositions Z1, Z2 and ZS are all clear and devoid of any droplet formation or clouding as perceivable by the naked eye.

1.3. Determination of ZS Clouding

As described under 1.2 in general terms, the polyol component (ZP) is initially charged to a three-neck flask equipped with mechanical stirrer and thermometer and subsequently admixed with the surfactant TD as described in the examples to obtain a composition Z1. Then, a composition Z2 consisting of the nucleating agent and the blowing agent as indicated in the examples is added. The flask is sealed gastight and the mixture is stirred at room temperature with a Vollrath stirrer at 1500 revolutions/min for about 30 min. The mixture obtained is stored gastight at room temperature and the clouding is determined visually. A solution is said to be clear when the naked eye is unable to discern any phase separation or droplet formation.

2. Production of Rigid Polyurethane Foams 2.1 Particulars Regarding Materials Used Polyol mixture consisting of:
polyol 1: polyetherol based on sucrose, glycerol and propylene oxide.
polyol 2: polyetherol based on vic-TDA, propylene oxide.
polyol 3: polyetherol based on vic-TDA, ethylene oxide and propylene oxide.
The polyol mixture used in the examples consists of the above polyols 1 to 3 being present at between 40-70% in the case of polyol 1, and between 15-50% in the case of polyol 2 and at between 5-25% in the case of polyol 3.
Catalyst mixture consisting of:
catalyst 1: dimethylcyclohexylamine
catalyst 2: pentamethyldiethylenetriamine
catalyst 3: tris(dimethylaminopropyl)hexahydro-1,3,5-triazine
The catalyst mixture used in the examples consists of the above catalysts 1 to 3 being present at between 20-60% in the case of catalyst 1, and between 20-50% in the case of catalyst 2 and at between 15-40% in the case of catalyst 3.
stabilizer: silicone stabilizer from Evonik, e.g., Tegostab B8467
blowing agent 1: cyclopentane (CP95)
blowing agent 2: cyclopentane/isopentane 70/30 (CP70)
blowing agent 3: 1,1,1,3,3-pentafluoropropane (HFC-245fa)
nucleating agent: FA-188 (from 3M)
surfactant TD 1: Isotridecanol N from BASF
surfactant TD 2: cocoamide DEA (REWOMID® DC 212 S from Evonik Industries AG, HLB=4.1)
surfactant TD 3 (V): laureth-23 (TEGO® Alkanol L 23 from Evonik Industries AG, HLB=10.3)
surfactant TD 4 (V): ceteareth-29 (Emuldac AS-25 from Sasol, HLB=10.4)
isocyanate: polymer MDI (Lupranat® M20 from BASF)
The HLB value of the surfactants used was computed using the increment procedure of Griffin as per table 1.

2.2 Laboratory Tests

The isocyanate component and stabilized composition (ZS) are temperature regulated to 20±0.5° C. The stabilized composition is obtained as described above under 1.2. The stabilized composition is initially charged to a 735 ml paper cup (PE coated), the isocyanate component is weighed in and the reaction mixture is stirred with a disk stirrer from Vollrath. The stopwatch is started as the stirring is started. Cream time, fiber time and apparent density are subsequently determined according to the following criteria:
Cream time is defined as the time interval between the start of stirring and the beginning of the volume expansion by the reaction mixture through foaming.
Fiber time describes the time from the start of commixing to the time in the reaction when strings can be pulled out from the foaming mass using a glass rod.
Apparent Density Determination:
After the foam has cured, the top of the foam is cut off. The cut is made at the edge of the test vessel perpendicularly to the direction of rise so that the location of the foam incision and the upper edge of the test vessel are in a or one plane. The beaker contents are weighed and the apparent free rise density (AD in kg/m$^3$) is computed by the following formula:

$$AD = \frac{(m_1 - m_2) * 1000}{V}$$

where
$m_1$=foam weight and weight of test vessel in g
$m_2$=weight of test vessel in g
V=volume of test vessel in ml The table which follows summarizes the formulation of the laboratory tests (numerical particulars in parts by weight) and the results thereof.

mixture was injected into temperature-regulated molds measuring 2000 mm×200 mm×50 mm and/or 400 mm×700 mm×90 mm and allowed to foam up therein. Overpack was 15%.

The starting materials used, the preparation properties and also the mechanical properties of the foams are described in the table which follows.

The table which follows summarizes the formulation of the machine tests (numerical particulars in parts by weight) and their results.

Surface quality is assessed visually by determining the frequency and intensity of surface defects relative to known systems. Test 1 was chosen as reference system (0=reference; +=lower number of defects and lower intensity of surface defects as compared with reference; −=higher number of defects and higher intensity of surface defects compared with reference).

| | | Composition | L1 | L2 | L3 | L4 | L5 | L6 | L7 | L8(comp) | L9(comp) |
|---|---|---|---|---|---|---|---|---|---|---|---|
| | | polyol mixture | 92.5 | 92.5 | 92.5 | 92.5 | 92.5 | 92.5 | 92.5 | 92.5 | 92.5 |
| | | catalyst mixture | 2.1 | 2.1 | 2.1 | 2.1 | 2.1 | 2.1 | 2.1 | 2.1 | 2.1 |
| | | stabilizer | 2.8 | 2.8 | 2.8 | 2.8 | 2.8 | 2.8 | 2.8 | 2.8 | 2.8 |
| | ZP | water | 2.6 | 2.6 | 2.6 | 2.6 | 2.6 | 2.6 | 2.6 | 2.6 | 2.6 |
| | | surfactant TD 1 | 3 | 3 | 2 | 3 | 3 | 3 | 3 | | |
| | | surfactant TD 2 | | | 1 | | | | | | |
| | | surfactant TD 3 (V) | | | | | | | | 3 | |
| Z1 | | surfactant TD 4 (V) | | | | | | | | | 3 |
| | | blowing agent 1 | 10 | 15 | 15 | | | | | 15 | 15 |
| | | blowing agent 2 | | | | 10.1 | 15.1 | | | | |
| | | blowing agent 3 | | | | | | 19.1 | 28.6 | | |
| ZS | Z2 | nucleating agent | 1 | 1 | 1 | 1 | 1 | 1 | 1 | 1 | 1 |
| | | sum total of parts by weight of ZS | 114 | 119 | 119 | 114.1 | 119.1 | 123.1 | 132.6 | 119 | 119 |
| | | ZS clouding | none | none | none | none | none | none | none | cloudy | cloudy |
| | | ZS foamed with | | | | | | | | | |
| | | Lupranat ® M20S | 151 | 151 | 151 | 151 | 151 | 151 | 151 | | |
| | | Properties | | | | | | | | | |
| | | cream time [s] | 8 | 10 | 10 | 8 | 10 | 10 | 10 | | |
| | | fiber time [s] | 56 | 64 | 60 | 55 | 64 | 60 | 70 | | |
| | | apparent density [g/l] | 32.1 | 27.2 | 25.5 | 31.1 | 27.2 | 31.6 | 27.7 | | |

Blowing agent proportions were adjusted so that the same molar proportions were used at all times.

2.3 Summary of Results

All compositions (ZP) with various surfactants TD (resulting in Z1) are initially cloudy following admixture of the various blowing agents together with the nucleating agent (Z2). However, when TD surfactants of the present invention are used, the clouding disappears completely after a few minutes to hours. Any phase separation is no longer detectable by the naked eye. When no surfactant or a TD surfactant that is not in accordance with the present invention is used in composition Z1, all ZS's are still cloudy after weeks and phase separate.

2.4 Machine Tests

The raw materials reported were used to prepare a stabilized composition (ZS) as described under 1.2. Using a Puromat® PU 30/80 IQ high-pressure machine (from Elastogran GmbH) at an output rate of 250 g/sec., ZS was mixed with the required amount of the reported isocyanate such that an isocyanate index of 110 was obtained. The reaction

| ZS | 1 | 2 | 3 (comp) | 4 (comp) |
|---|---|---|---|---|
| polyol mixture | 92.55 | 92.55 | 92.7 | 92.7 |
| catalyst mixture | 2.1 | 2.1 | 2.05 | 2.05 |
| stabilizer | 2.8 | 2.8 | 2.75 | 2.75 |
| water | 2.55 | 2.55 | 2.5 | 2.5 |
| surfactant TD | 2 | 3.5 | 0 | 0 |
| blowing agent 1 | 13.5 | 13.5 | 13.5 | 13.5 |
| nucleating agent | 1 | 1.5 | 1 | 0 |
| sum total of parts by weight of polyol component | 116.5 | 118.5 | 114.5 | 113.5 |
| ZS appearance | clear at RT | clear at RT | cloudy at RT | clear at RT |
| ZS foamed with | | | | |
| Lupranat ® M20S | 150 | 150 | 151 | 151 |
| cream time [s] | 5 | 5 | 4 | 5 |
| fiber time [s] | 44 | 44 | 38 | 42 |
| free rise density [g/l] | 22.4 | 22.4 | 22.2 | 22.9 |
| thermal conductivity [mW/m*K] | 17.9 | 17.8 | 17.9 | 18.6 |
| surface quality | 0 | + | − | 0 |

We claim:

1. A method of producing polyurethane or polyisocyanurate foams, the method comprising:
   (a) forming a composition (Z1) by adding a surfactant TD, having an HLB value below 6 and no silicon atom, to a composition (ZP) comprising at least one polyol and at least one catalyst that catalyzes formation of a urethane, urea or isocyanurate bond; and
   (b) reacting the composition (Z1) with at least one polyisocyanate, to obtain a polyurethane foam or a polyisocyanurate foam,
   wherein:
   from 0.05 to 10 parts by mass of the surfactant TD are added per 100 parts by mass of the composition (ZP);
   the reacting occurs in the presence of at least one nucleating agent selected from the group consisting of a perfluorinated hydrocarbon, an ether having at least one perfluorinated hydrocarbyl moiety and a ketone having at least one perfluorinated hydrocarbyl moiety, and a blowing agent, wherein the nucleating agent differs from the blowing agent; and
   the nucleating agent and the blowing agent are mixed to obtain a composition (Z2) that is added to the composition (Z1) to obtain a composition (ZS) before the reacting with the at least one polyisocyanate, wherein after composition (Z2) is added to composition (Z1) and prior to the reacting with the at least one polyisocyanate, the composition (ZS) is stabilized such that said composition (ZS) is clear and devoid of any droplet formation or clouding as perceivable by the naked eye, and
   wherein the surfactant TD is isotridecanol or isononanol.

2. The method according to claim 1, wherein the surfactant TD is isotridecanol.

3. The method according to claim 1, wherein the surfactant TD is isononanol.

4. The method according to claim 1, wherein the nucleating agent is at least one selected from the group consisting of a perfluorinated hydrocarbon and an ether having at least one perfluorinated hydrocarbyl moiety.

5. The method according to claim 1, wherein from 0.1 to 10 parts by mass of the nucleating agent is added per the 100 parts by mass of composition (ZP).

6. The method according to claim 1, wherein the nucleating agent is selected from the group consisting of perfluoropentane $C_5F_{12}$, perfluorohexane $C_6F_{14}$, perfluorocyclohexane $C_6F_{12}$, perfluoroheptane $C_7F_{16}$, perfluorooctane $C_8F_{18}$, a perfluorinated olefin of the empirical formulae $C_5F_{10}$, $C_6F_{12}$, $C_7F_{14}$, $C_8F_{16}$, a dimer of 1,1,2,3,3,3-hexafluoro-1-propene, methoxyheptafluoropropane, methoxynonafluorobutane and ethoxynonafluorobutane.

7. The method according to claim 1, wherein the at least one polyol is selected from the group consisting of a polyether alcohol and a polyester alcohol.

8. The method according to claim 1, wherein the at least one polyisocyanate comprises an aromatic polyfunctional isocyanate.

9. The method according to claim 1, wherein the catalyst comprises at least one selected from the group consisting of triethylamine, dimethylcyclohexylamine, tetramethylethylene diamine, tetramethylhexanediamine, pentamethyldiethylenetriamine, pentamethyldipropylenetriamine, triethylenediamine, dimethylpiperazine, 1,2-dimethyl imidazole, N-ethylmorpholine, tris(dimethylaminopropyl)hexahydro-1,3,5-triazine, N, N-dimethylbenzylamine, dimethylaminoethanol, dimethylaminoethoxyethanol and bis(dimethylaminoethyl) ether.

10. The method according to claim 1, wherein the catalyst comprises at least two selected from the group consisting of triethylamine, dimethylcyclohexylamine, tetramethylethylene diamine, tetramethylhexanediamine, pentamethyldiethylenetriamine, pentamethyldipropylenetriamine, triethylenediamine, dimethylpiperazine, 1,2-dimethyl imidazole, N-ethylmorpholine, tris(dimethylaminopropyl)hexahydro-1,3,5-triazine, N, N-dimethylbenzylamine, dimethylaminoethanol, dimethylaminoethoxyethanol and bis(dimethylaminoethyl) ether.

11. The method according to claim 1, wherein the polyol comprises at least one polyetherol containing:
   a structural unit based on propylene oxide, ethylene oxide, or both; and
   a structural unit based on trimethylolpropane, pentaerythritol, castor oil, glucose, sorbitol, mannitol, sucrose, a polyhydric phenol, a resol, melamine, an aniline, a toluendiamine, a methylenedianiline, or mixtures thereof.

12. The method according to claim 1, wherein the polyol comprises at least two polyethers, said polyetherols each containing:
   a structural unit based on propylene oxide, ethylene oxide, or both; and
   a structural unit based on trimethylolpropane, pentaerythritol, castor oil, glucose, sorbitol, mannitol, sucrose, a polyhydric phenol, a resol, melamine, an aniline, a toluendiamine, a methylenedianiline, or mixtures thereof.

13. The method according to claim 1, wherein the blowing agent does not include a hydrofluorocarbon.

* * * * *